US012763316B2

(12) United States Patent
Shim et al.

(10) Patent No.: US 12,763,316 B2
(45) Date of Patent: Oct. 13, 2026

(54) METHOD FOR FORMING ALIGNED STRUCTURE OF GRAPHITE, METHOD FOR FABRICATING ELECTRODE FOR BATTERY HAVING ALIGNED GRAPHITE AND LITHIUM SECONDARY BATTERY HAVING ALIGNED GRAPHITE

(71) Applicant: KOREA INSTITUTE OF MACHINERY & MATERIALS, Daejeon (KR)

(72) Inventors: Hyungcheoul Shim, Daejeon (KR); Seungmin Hyun, Daejeon (KR); Jinyoeng Lee, Daejeon (KR); Hyemi So, Daejeon (KR); Minsub Oh, Seoul (KR); Ilhwan Kim, Gyeonggi-do (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 752 days.

(21) Appl. No.: 18/068,920

(22) Filed: Dec. 20, 2022

(65) Prior Publication Data

US 2023/0129924 A1 Apr. 27, 2023

Related U.S. Application Data

(63) Continuation of application No. PCT/KR2020/014803, filed on Oct. 28, 2020.

(30) Foreign Application Priority Data

Jun. 22, 2020 (KR) ........................ 10-2020-0075595

(51) Int. Cl.
*H01M 4/1393* (2010.01)
*H01M 4/04* (2006.01)
(Continued)

(52) U.S. Cl.
CPC ....... *H01M 4/1393* (2013.01); *H01M 4/0404* (2013.01); *H01M 4/0471* (2013.01); *H01M 2004/027* (2013.01); *H01M 10/0525* (2013.01)

(58) Field of Classification Search
CPC ............. H01M 4/1393; H01M 4/0404; H01M 4/0471; H01M 4/133
See application file for complete search history.

(56) References Cited

U.S. PATENT DOCUMENTS

2004/0072076 A1 * 4/2004 Matsubara ............... H01B 1/24 252/511

FOREIGN PATENT DOCUMENTS

CN 110571406 A * 12/2019 ............ H01M 4/624
JP 2006-127823 A 5/2006
(Continued)

OTHER PUBLICATIONS

Dang D., Wang Y., Gao S., Cheng Y.-T. Freeze-Dried Low-Tortuous Graphite Electrodes with Enhanced Capacity Utilization and Rate Capability. Carbon. 2020;159:133-139. doi: 10.1016/j.carbon.2019.12.036. (Year: 2019).*
(Continued)

*Primary Examiner* — Livius R. Cazan
(74) *Attorney, Agent, or Firm* — LEX IP MEISTER, PLLC

(57) ABSTRACT

A disclosed method for forming aligned structure of graphite includes coating a graphite composition including a graphite particle, a binder and a solvent on a substrate, applying a magnetic field to the graphite composition coated on the substrate to align the graphite particle, freezing the graphite composition including the aligned graphite particle, and subliming the frozen solvent of the graphite composition to remove the frozen solvent.

4 Claims, 7 Drawing Sheets

(51) Int. Cl.

| | |
|---|---|
| *H01M 4/02* | (2006.01) |
| *H01M 10/0525* | (2010.01) |

(56) References Cited

FOREIGN PATENT DOCUMENTS

| | | | | | |
|---|---|---|---|---|---|
| JP | 4274090 | B2 | | 3/2009 | |
| JP | 2012-156006 | A | | 8/2012 | |
| JP | 5652682 | B2 | | 11/2014 | |
| KR | 20000028032 | A | * | 5/2000 | .............. H01M 4/04 |
| KR | 10-0445438 | B1 | | 8/2004 | |
| KR | 10-0454028 | B1 | | 10/2004 | |
| KR | 10-1382257 | B1 | | 4/2014 | |
| KR | 2015-0143790 | A | | 12/2015 | |
| KR | 2017-0037898 | A | | 4/2017 | |

OTHER PUBLICATIONS

International Search Report for corresponding International Application No. PCT/KR2020/014803 mailed Mar. 17, 2021.

Written Opinion for corresponding International Application No. PCT/KR2020/014803 dated Mar. 17, 2021.

Billaud et al., "Magnetically aligned graphite electrodes for high-rate performance Li-ion batteries", nature energy, Jul. 4, 2016, 16097, DOI: 10.1038/NENERGY.2016.97 (cited on p. 2 of the specification).

Lin et al., "Orientation Control of Graphene Flakes by Magnetic Field: Broad Device Applications of Macroscopically Aligned Graphene", Advanced Science News, 2017, 29, 1604453 (cited on p. 2 of the specification).

Yoshimoto et al., "Electrochemical Characterization of Li-Intercalated Pyrolytic Graphite", Synthetic Metals, 41-43, 1991, p. 2707-2710 (cited on p. 2 of the specification).

* cited by examiner

METHOD FOR FORMING ALIGNED STRUCTURE OF GRAPHITE, METHOD FOR FABRICATING ELECTRODE FOR BATTERY HAVING ALIGNED GRAPHITE AND LITHIUM SECONDARY BATTERY HAVING ALIGNED GRAPHITE

CROSS REFERENCE TO RELATED APPLICATIONS

This is a continuation of International Application No. PCT/KR2020/014803 filed on Oct. 28, 2020, which claims priority from Korean Patent Application No. 10-2020-0075595 filed on Jun. 22, 2020. The contents of these applications are incorporated herein by reference in their entireties.

TECHNICAL FIELD

The disclosure relates to a method for fabricating an electrode for a battery. More particularly, the disclosure relates to a method for forming an aligned structure of graphite and a method for fabricating an electrode for a battery, which has aligned graphite.

BACKGROUND

Graphite is actively used as an electrode (anode or cathode) material for a lithium ion secondary battery or the like due to its characteristics of high conductivity and stability. When an electrode material containing graphite is used as an anode of a lithium ion secondary battery, a capacity is achieved as lithium ions intercalate and deintercalate from graphite. When lithium ions move toward a basal plane of graphite, a resistance against intercalation and deintercalation is larger than when lithium ions move toward an edge plane of graphite. Thus, transportability of ions relative to lithium ions may be lowered, and this tendency may increase as a charging speed increases.

In order to solve this problem, a method of manufacturing an electrode in which graphite is aligned using a magnetic field is being studied. However, since a conventional method assembles iron oxide nanoparticles with graphite to control the graphite with a magnetic field, a following process is required for removing iron oxide. When residual iron oxide remains on graphite, or when an acid-treating process for removing iron oxide is performed, a charge/discharge efficiency may be lowered.

Furthermore, if a drying process is performed immediately after aligning graphite of a slurry state with a magnetic field, an alignment degree of the graphite may decrease from the time when the magnetic field is removed. When the drying process is performed simultaneously with an aligning process, a magnetic field may be lowered by increase of a temperature thereby reducing the alignment degree.

Furthermore, when a solvent having a relatively low sublimation point, such as ethanol or the like, is used for simultaneously applying a magnetic field and drying the solvent, a conventional solvent (water or NMP(n-methyl-2-pyrrolidone)) and a conventional binder, which are used in a process using a commercial product, cannot be used.

Non-Patent Literatures (1) Nature Energy, 2016, 1, 16097.
(2) Advanced Materials, 2017, 29, 1604453.
(3) Synthetic Metals, 1991, 41-43, 2707-2710.

BRIEF SUMMARY

One object of the disclosure is to provide a method for forming an aligned structure of graphite, which may increase alignment degree of graphite.

Another object of the disclosure is to provide a method for fabricating an electrode for a battery, which may increase performance of a battery due to increased alignment degree of graphite.

Another object of the disclosure is to provide a lithium secondary battery including aligned graphite as an active material.

According to embodiments to accomplish the objectives of the present disclosure, a method for forming aligned structure of graphite includes coating a graphite composition including a graphite particle, a binder and a solvent on a substrate, applying a magnetic field to the graphite composition coated on the substrate to align the graphite particle, freezing the graphite composition including the aligned graphite particle, and subliming the frozen solvent of the graphite composition to remove the frozen solvent.

A method for forming an electrode for a battery includes coating an active material composition including a graphite particle, a binder and a solvent on a current collector, applying a magnetic field to the active material composition coated on the current collector to align the graphite particle, freezing the active material composition including the aligned graphite particle, and subliming the frozen solvent of the active material composition to remove the frozen solvent and to form an active material layer.

In an embodiment, the graphite particle includes pyrolytic graphite.

In an embodiment, the solvent includes at least one selected from the group consisting of water and an organic solvent including N-methyl pyrrolidone, dimethylformamide, acetone or dimethylacetamide.

In an embodiment, the active material composition is frozen while a magnetic field is applied to the active material composition.

In an embodiment, the active material composition further includes a conductive material.

In an embodiment, the active material composition includes 1 wt % to 30 wt % of the graphite particle, 0.1 wt % to 10 wt % of the binder, 0.1 wt % to 10 wt % of the conductive material and 50 wt % to 97 wt % of the solvent.

In an embodiment, the active material composition includes 2 wt % to 10 wt % of the graphite particle, 0.3 wt % to 1.5 wt % of the binder, 0.3 wt % to 1.5 wt % of the conductive material and 89 wt % to 97 wt % of the solvent.

In an embodiment, a temperature for freezing the active material composition is equal to or less than −100° C.

In an embodiment, subliming the frozen solvent of the active material composition is performed in a decompression chamber.

In an embodiment, the graphite particle includes a bulk particle having an average diameter of 1 μm to 30 μm and a fine particle having an average diameter that is equal to or more than 0.05 μm and less than 1 μm with a weight ratio of 10:1 to 3:1.

According to the present disclosure, an active material composition coated on a current collector is frozen thereby fixing alignment of a graphite particle. Since a solvent is removed while alignment of the graphite particle is fixed, decrease of alignment of the graphite particle in a process of removing the solvent may be prevented or minimized.

Furthermore, it is not required to use a solvent having a low boiling point, such as ethanol, for reducing drying time. Thus, conventionally known and commercially available binders may be used.

Furthermore, when a temperature falls in a freezing process, a magnetism of a magnetic substance may increase. Thus, alignment of a graphite particle may further increase.

Furthermore, since a ferromagnetic substance such as iron oxide is not used for aligning a graphite particle, decrease of performance or reliability for a battery due to iron oxide may be prevented.

DETAILED DESCRIPTIONS

Figure 1A:
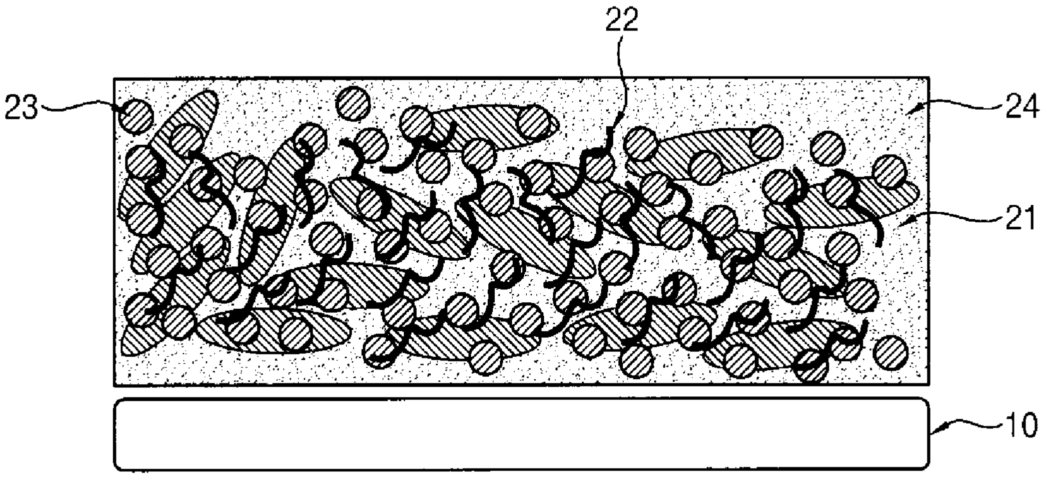
FIGS. 1A to 1E are cross-sectional views illustrating a method for fabricating an electrode according to an embodiment.

Example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity. It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Method for Fabricating Electrode

FIGS. 1A to 1E are cross-sectional views illustrating a method for fabricating an electrode according to an embodiment.

Referring to FIG. 1A, an active material composition is coated on a current collector 10. The active material composition may include a graphite particle 21, a binder 22, a conductive material 23 and a solvent 24.

For example, the current collector 10 may have a thickness of 3 μm to 500 μm. Any material that does not cause chemical transformation of a battery and has electric conductivity may be used for the current collector 10. For example, the current collector 10 may include copper, gold, stainless steel, aluminum, nickel, titanium, blacked carbon, copper or stainless steel, which is surface-treated with carbon, nickel, titanium, silver or the like, aluminum-cadmium alloy, or the like.

In an embodiment, the graphite particle 21 may have diamagnetic anisotropy. For example, the graphite particle 21 may have a plate shape, and diamagnetic anisotropy of the graphite particle 21 in a direction vertical to a (002) plane may be ten times or more of diamagnetic anisotropy of the graphite particle 21 in a direction vertical to a (110) plane.

In an embodiment, the graphite particle 21 having diamagnetic anisotropy may include pyrolytic graphite. An average diameter ($D_{50}$) of the graphite particle 21 may b1 0.05 μm to 30 μm.

In an embodiment, the graphite particle 21 may include a bulk particle and a fine particle. For example, an average diameter of the bulk particle may be 1 μm to 30 μm and an average diameter of the fine particle may be equal to or more than 0.05 μm and less than 1 μm. When a content of the fine particle increases, reactivity with lithium ions may increase by increase of a surface area thereof. When a content of the fine particle is excessively large, an electrolyte may be degraded or deformed by side reaction. In an embodiment, a weight ratio of the bulk particle and the fine particle may be 10:1 to 3:1.

For example, the binder 22 may include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, styrene-butadiene rubber (SBR), fluoro-rubber, a copolymer thereof, or the like.

For example, the conductive material 23 may include carbon black such as acetylene black, ketjen black, channel black, furnace black, lamp black, summer black or the like; conductive fibers such as a carbon fiber, a metal fiber or the like; conductive powder such as carbon nanotube, carbon fluoride powder, aluminum powder, nickel powder or the like; conductive whiskers such as zinc oxide, potassium titanate or the like; conductive metal oxides such as titanium oxide or the like; or conductive materials such as a polyphenylene derivative or the like.

For example, the solvent 24 may include an organic solvent such as N-methyl pyrrolidone, dimethylformamide, acetone, dimethylacetamide or the like, water or a combination thereof.

In an embodiment, the active material composition may include 1 wt % to 30 wt % of the graphite particle 21, 0.1 wt % to 10 wt % of the binder 22, 0.1 wt % to 10 wt % of the conductive material 23 and 50 wt % to 97 wt % of the solvent 24.

Preferable, a content of the solvent 24 may be larger than 89 wt %. For example, a content of the solvent 24 may be 89 wt % to 97 wt %. When a content of the solvent 24 is not sufficiently high, a viscosity of the composition may increase. Thus, it may be difficult that the graphite particles are orientated well by a magnetic field. Furthermore, when a content of the solvent 24 is excessively large, it may be difficult to form an electrode having a proper thickness, or mechanical properties of an electrode may be deteriorated by excessively increased porosity. For example, the active material composition may include 2 wt % to 10 wt % of the graphite particle, 0.3 wt % to 1.5 wt % of the binder, 0.3 wt % to 1.5 wt % of the conductive material and 89 wt % to 97 wt % of the solvent.

Figure 1B:
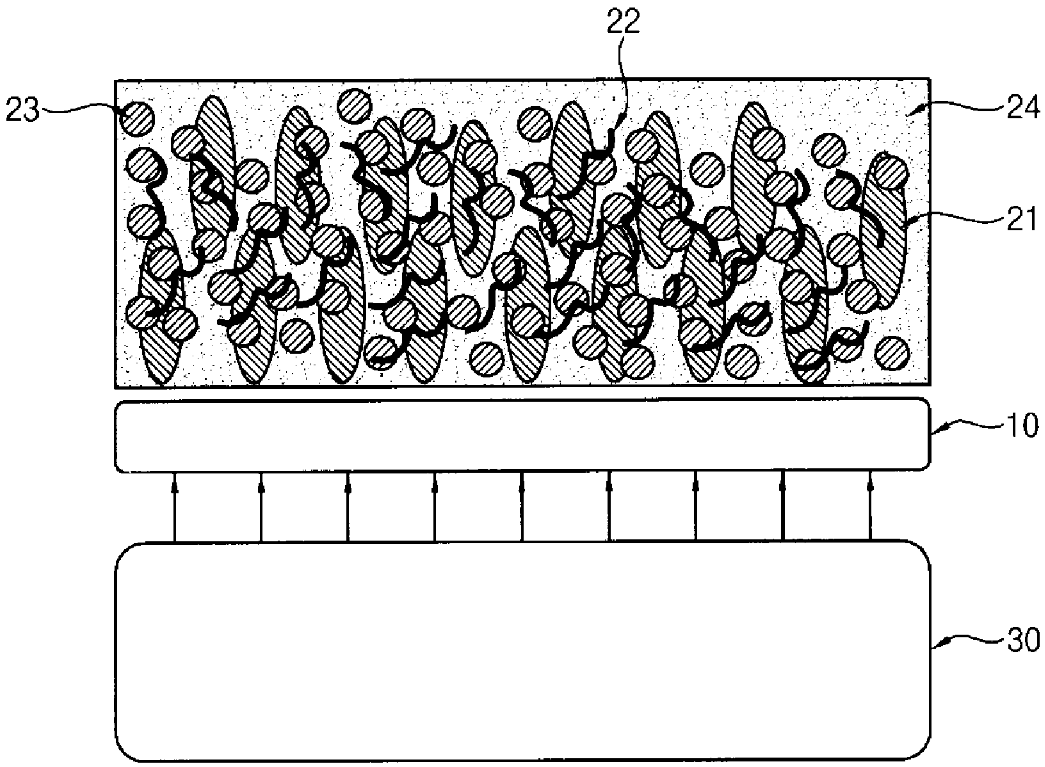

Referring to FIG. 1B, a magnetic field is applied to the active material composition coated on the current collector 10 for alignment. For example, a magnetic substance such as a permanent magnet 30 may be disposed on a second surface of the current collector 10 so that a longitudinal axis of the graphite particle 21 is orientated to be vertical to a first surface of the current collector 10. For example, a distance between the current collector 10 and the permanent magnet 30 may be less than 1 cm, and a magnetic flux may be 1,000 Gauss to 10,000 Gauss.

Figure 1C:
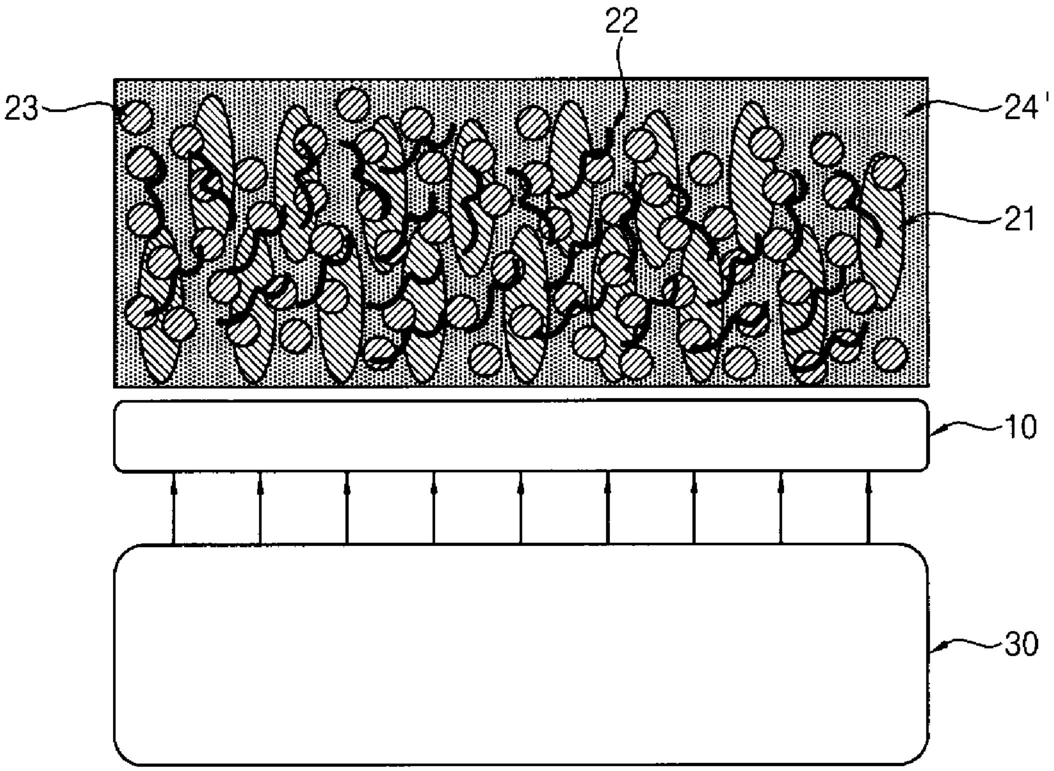

Referring to FIG. 1C, while a magnetic field is applied to the active material composition coated on the current collector 10, the active material composition is cooled to be frozen.

Since the active material composition is frozen while a magnetic field is applied thereto, alignment of the graphite particle 21 may be fixed.

A temperature for freezing may be changed depending on the solvent 24'. For example, the temperature for freezing may be equal to or less than the freezing point of the solvent 24'. For example, when the solvent 24' includes an organic solvent such as N-methyl pyrrolidone, the temperature for freezing may be equal to or less than −100° C. When the solvent 24' is water, the temperature for freezing may be equal to or less than −20° C.

Figure 1D:
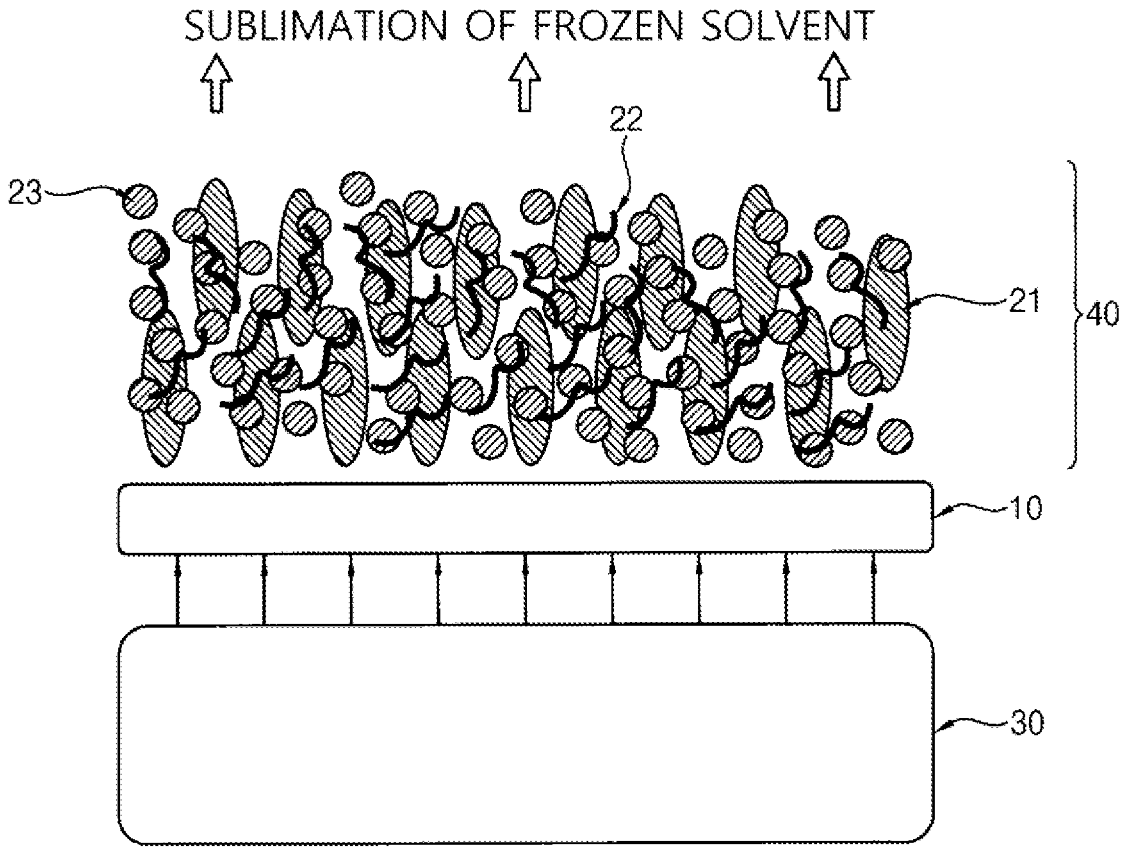

Referring to FIGS. 1C and 1D, the frozen solvent 24' in the frozen active material composition is sublimed to be removed.

For example, a decompression chamber may be used for subliming the frozen solvent 24'. The current collector 10 with the frozen active material composition may be disposed in a decompression chamber. When a negative pressured is provided, the frozen solvent 24' may be sublimed thereby forming an active material layer 40 in which the solvent is removed. While the frozen solvent 24' is sublimed, a temperature equal to or less than the freezing point of the solvent may be maintained to prevent the frozen solvent 24' from turning into a liquid phase. Furthermore, while the frozen solvent 24' is sublimed, the permanent magnet 30 may be maintained under the current collector 10.

In an embodiment, the frozen solvent 24' is sublimed from a solid state without going through a liquid phase. Thus, in a process of removing the frozen solvent 24', alignment of the graphite particle 21 may not be deteriorated, or decrease of alignment may be minimized.

Figure 1E:
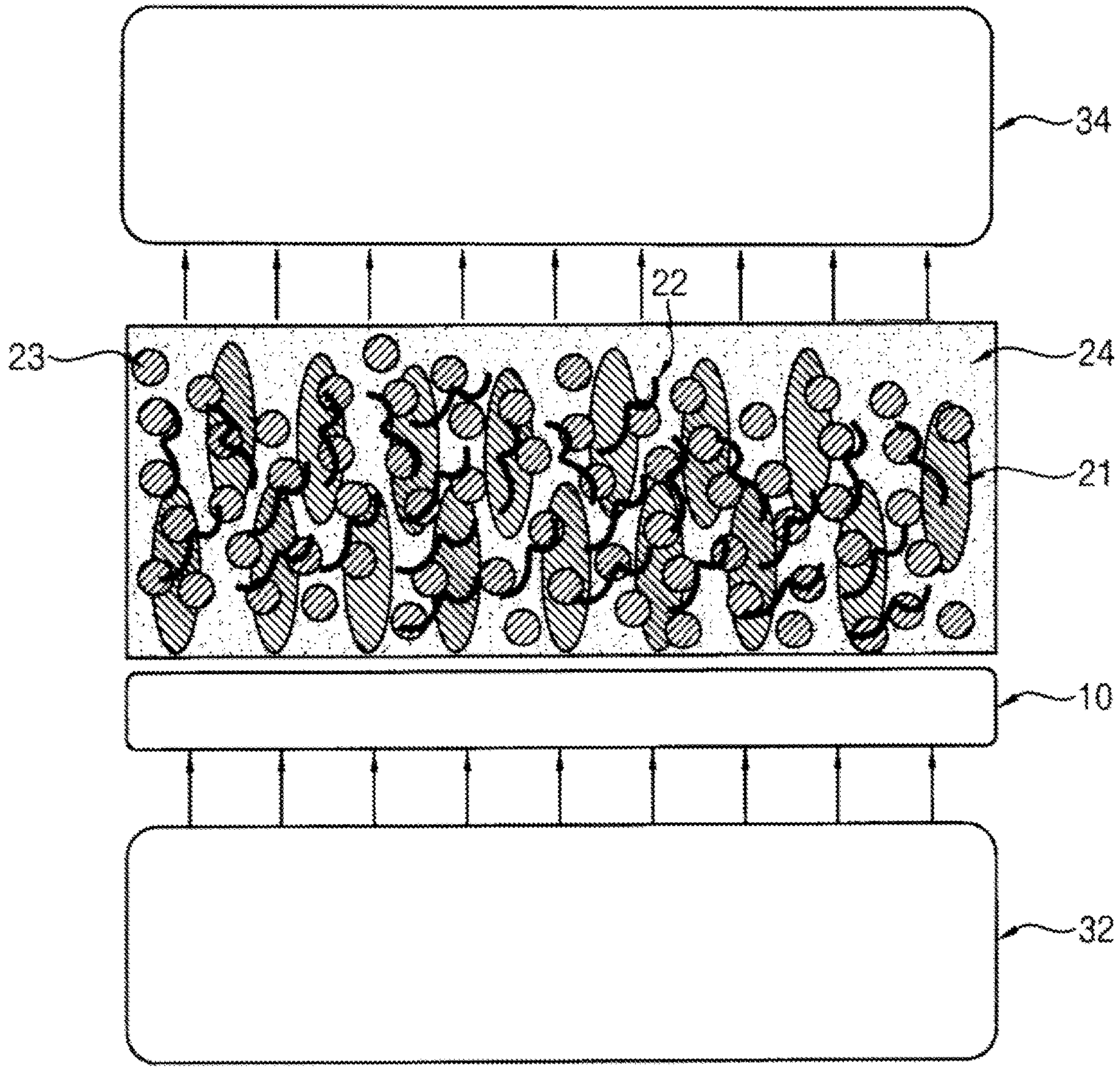

In another embodiment, in order to increase alignment of the graphite particle 21, an additional permanent magnet may be used. For example, as illustrated in FIG. 1E, a first permanent magnet 32 may be disposed on a bottom surface of a current collector 10, and a second permanent magnet 34 may be disposed above an upper surface of an active material coating layer.

According to the present disclosure, an active material composition coated on a current collector is frozen thereby fixing alignment of a graphite particle. Since a solvent is removed while alignment of the graphite particle is fixed, decrease of alignment of the graphite particle in a process of removing the solvent may be prevented or minimized.

Furthermore, it is not required to use a solvent having a low boiling point, such as ethanol, so as to reduce drying time. Thus, conventionally known and commercially available binders may be used.

Furthermore, when a temperature falls in a freezing process, a magnetism of a magnetic substance may increase. Thus, alignment of a graphite particle may further increase.

Furthermore, since a ferromagnetic substance such as iron oxide is not used for aligning a graphite particle, decrease of performance or reliability for a battery due to iron oxide may be prevented.

Although a method for fabricating an electrode is disclosed in the above embodiment, embodiments of the present disclosure are not limited thereto, and may include various methods for obtaining an aligned structure of graphite. For example, if necessary, a current collector may be replaced by an insulating ceramic substrate, a polymer substrate or the like.

Lithium Secondary Battery

Figure 2:
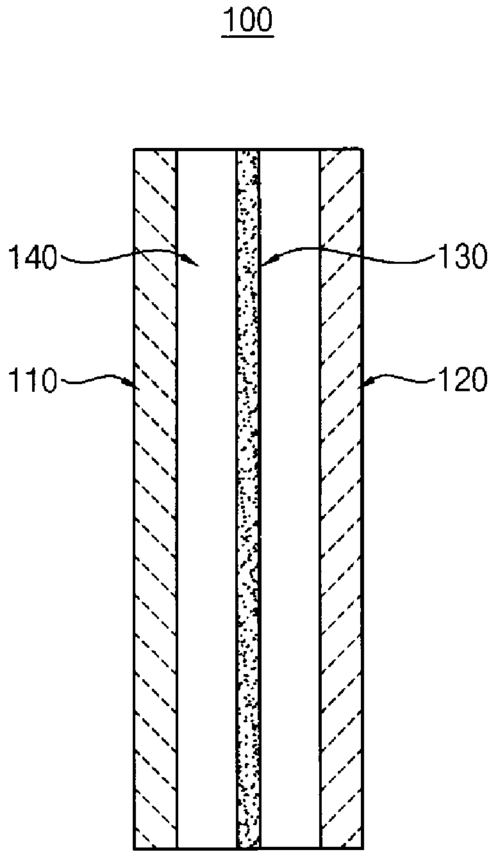
FIG. 2 is a cross-sectional view illustrating a lithium secondary battery according to an embodiment.

An electrode according to the present disclosure may be used as an anode of a lithium secondary battery. For example, referring to FIG. 2, a lithium secondary battery 100 may include an anode 110, a cathode 120, a separator 130 separating the anode 110 from the cathode 120 and an electrolyte 140.

In an embodiment, the anode 110 may be substantially the same as the electrode illustrated in FIG. 1D. For example, the anode 110 may include a current collector and an active material layer coated on at least a surface of the current collector. The active material layer may include graphite particles aligned in a direction.

The cathode 120 may include a cathode active material. Preferably, lithium transition metal oxide may be used for the cathode active material. For example, the cathode active material may include at least one selected from the group of $L_{ix1}CoO_2$(0.5<x1<1.3), $Li_{x2}NiO_2$(0.5<x2<1.3), $Li_{x3}MnO_2$ (0.5<x3<1.3), $Li_{x4}Mn_2O_4$ (0.5<x4<1.3), $Li_{x5}(Ni_{a1}Co_{b1}Mn_{c1})O_2$ (0.5<x5<1.3, 0<a1<1, 0<b1<1, 0<c1<1, a1+b1+c1=1), $Li_{x6}Ni_{1-y1}Co_{y1}O_2$ (0.5<x6<1.3, 0<y1<1), $Li_{x7}Co_{1-y2}Mn_{y2}O_2$ (0.5<x7<1.3, 0<y2<1), $Li_{x8}Ni_{1-y3}Mn_{y3}O_2$ (0.5<x8<1.3, O<y3<1), $Li_{x9}(Ni_{a2}Co_{b2}Mn_{c2})O_4$ (0.5<x9<1.3, 0<a2<2, 0<b2<2, 0<c2<2, a2+b2+c2=2), $Li_{x10}Mn_{2-z1}Ni_{z1}O_4$ (0.5<x10<1.3, 0<z1<2), $Li_{x11}Mn_{2-z2}Co_{z2}O_4$ (0.5<x11<1.3, 0<z2<2), $Li_{x12}CoPO_4$ (0.5<x12<1.3) and $Li_{x13}FePO_4$ (0.5<x13<1.3).

For example, the separator 130 may include a conventional porous polymer film, which is formed of polyolefin-based polymer such as ethylene homopolymer, propylene homopolymer, ethylene/butene copolymer, ethylene/hexene copolymer and ethylene/methacrylate copolymer, in a single film or a stack of films. In addition, a conventional non-woven fabric, for example, formed of glass fibers having a high melting point, polyethylene terephthalate fibers or the like may be used for the separator 130, however, embodiments are not limited thereto.

For example, the electrolyte 140 may include an organic solvent including at least one selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, ethyl propionate and butyl propionate.

The electrolyte 140 may further include a lithium salt. An anion of the lithium salt may include at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

A morphology of the lithium secondary battery is not particularly limited. For example, the lithium secondary battery may have a cylindrical shape, a prismatic shape, a pouch shape, a coin shape or the like.

Hereinafter, effects of embodiments of the present disclosure will be explained with reference to particular examples and experiments.

Example 1

An active material composition including about 16 wt % of pyrolytic graphite (a bulk particle and a fine particle with a weight ratio of 5:1), about 2 wt % of a binder (PVDF and CMC), about 2 wt % of a conductive material (carbon black), and about 80 wt % of a solvent (N-methyl pyrrolidone) was bar-coated with a thickness of 250 μm on a copper foil having a thickness of about 20 μm. The fine particle was obtained from spex-milling the bulk particle for 30 minutes.

After a permanent magnet (width/length/height: 500 mm/500 mm/10 mm) having a magnetism of about 500 mT was disposed under the copper foil by a distance of about 10 mm, the active material composition was frozen for about 3 hours at about −135° C. in a chiller. Thereafter, the active material composition was vacuum-dried to fabricate an electrode sample.

Example 2

An electrode sample was fabricated through a substantially same method as Example 1 except that a permanent magnet was disposed under a copper foil and above a coating layer, respectively.

Comparative Example 1

An electrode sample was fabricated through a substantially same method as Example 1 except for not using a permanent magnet.

Figure 3:
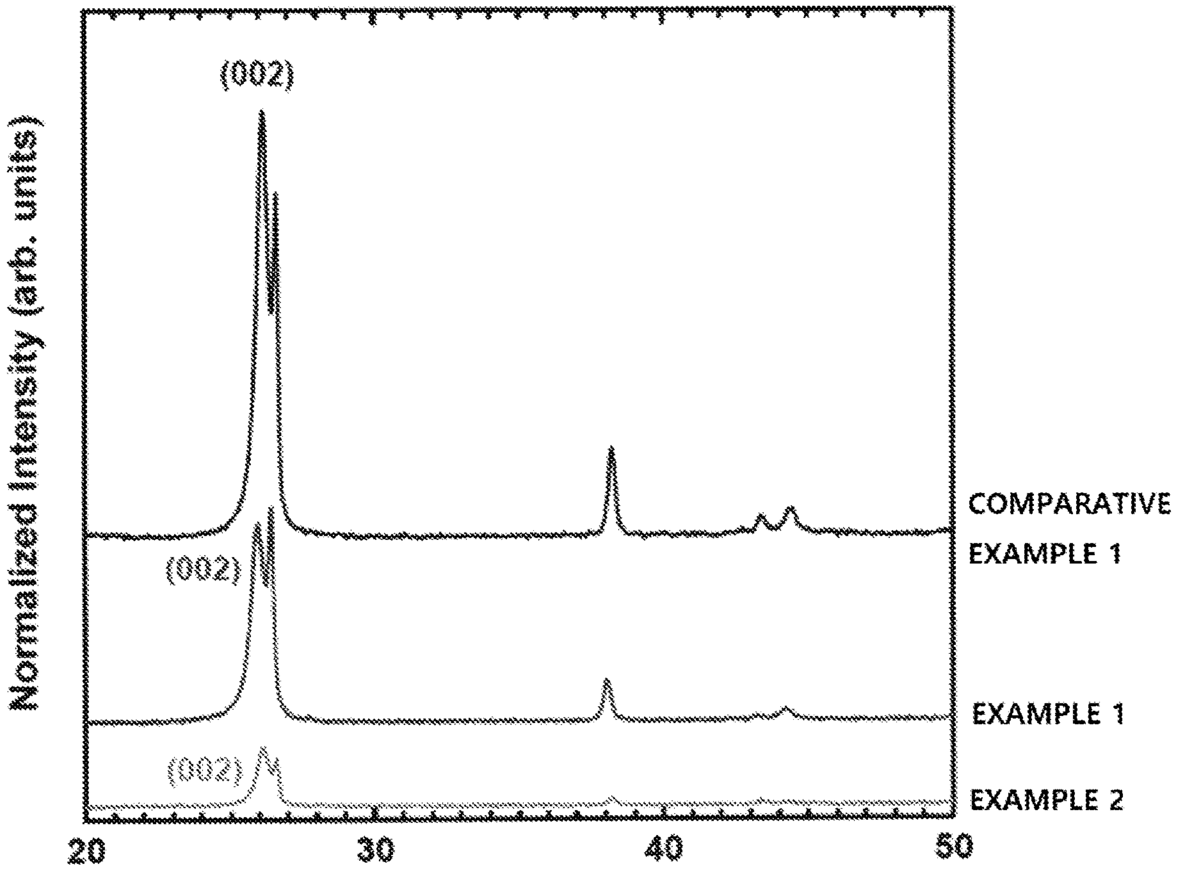
FIG. 3 is a graph showing XRD (X-ray diffraction) analysis data of Example 1, Example 2 and Comparative Example 1.

FIG. 3 is a graph showing XRD (X-ray diffraction) analysis data of Example 1, Example 2 and Comparative Example 1.

Referring to FIG. 3, with compared to the electrode sample of Comparative Example 1 fabricated without alignment using a permanent magnet, peak intensities corresponding to a (002) plane of graphite were reduced in the electrode samples of Examples 1 and 2, which were fabricated through alignment using a permanent magnet. Furthermore, the peak intensity were reduced more in Example 2, which was provided with a magnetic field from both sides, than in Example 1, which was provided with a magnetic field from a single side.

Decrease of the peaks means that exposure of a basal plane was reduced and that exposure of an edge plane was increased. Thus, it can be noted that addition of a magnet may further increase alignment of graphite particles toward to the edge plane. It may result from a magnetic field prevented from spreading on edges of the magnet by a sandwich configuration of magnets as illustrated in FIG. 1E.

Example 3

An electrode sample was fabricated through a substantially same method as Example 1 except for using an active material composition including about 8.7 wt % of the pyrolytic graphite, about 1.1 wt % of a binder (PVDF or SBR—CMC mixture), about 1.1 wt % of a conductive material (carbon black), and about 89.1 wt % of a solvent (N-methyl pyrrolidone).

Figure 4:
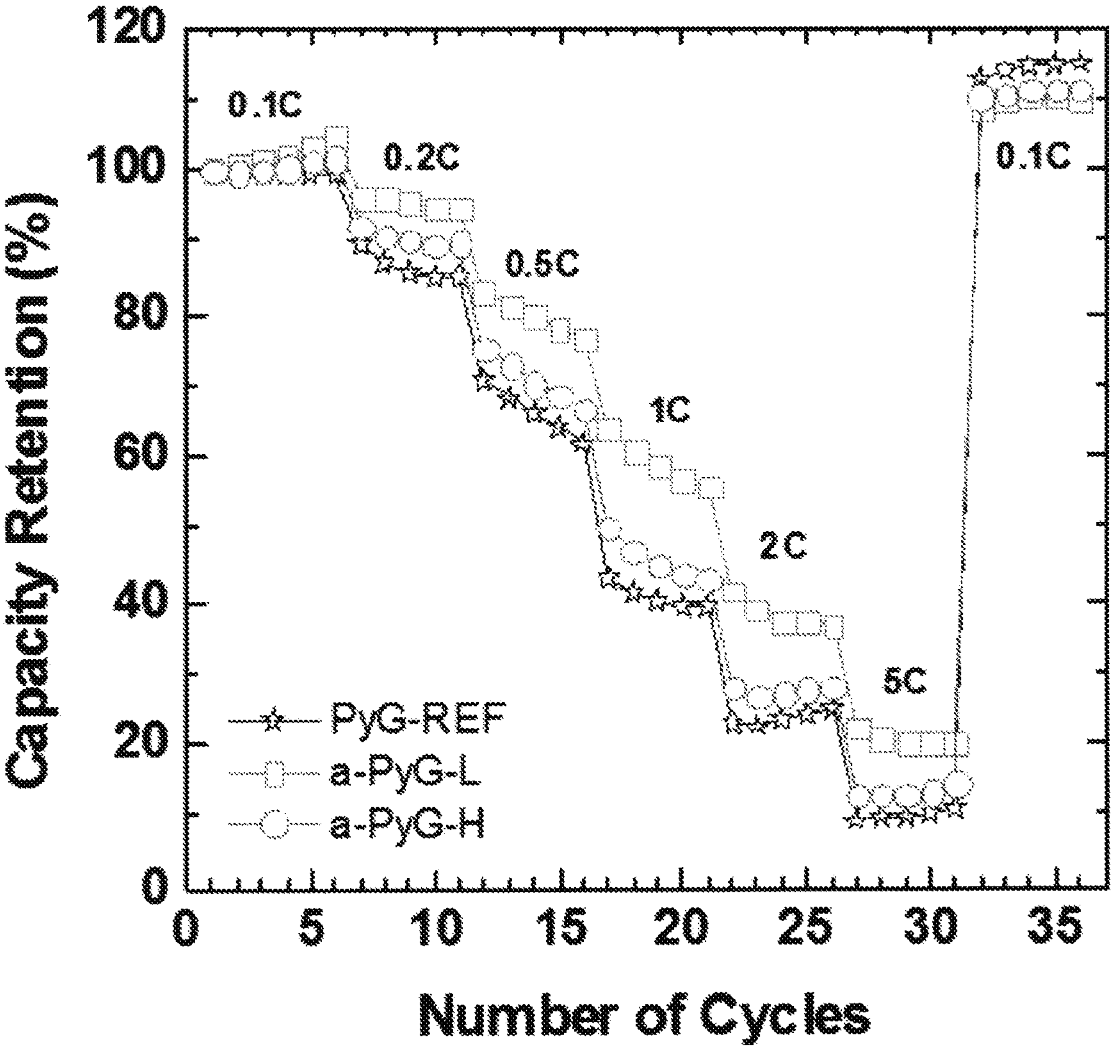
FIG. 4 is a graph showing capacity retention of Example 1 (a-PyG-H), Example 3 (a-PyG-L) and Comparative Example 1 (PyG-REF) depending on the number of charging cycles.

FIG. 4 is a graph showing capacity retention of Example 1 (a-PyG-H), Example 3 (a-PyG-L) and Comparative Example 1 (PyG-REF) depending on the number of charging cycles.

Referring to FIG. 4, capacity retention was larger in Example 3 using a larger content of a solvent than in Example 1 using a smaller content of a solvent. Thus, it can be noted that it may be difficult to achieve alignment effect due to a magnetic field unless a viscosity of the composition is sufficiently low.

The foregoing is illustrative of embodiments and is not to be construed as limiting thereof. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

A micro-separator fog gas chromatography according to embodiments may be used for detecting various harmful materials including drugs.

REFERENCE NUMERALS

10: current collector
21: graphite particle
22: binder
23: conductive material
24: solvent
30, 32, 34: permanent magnet
100: lithium secondary battery
110: anode
120: cathode
130: separator
140: electrolyte

What is claimed is:

1. A method for forming an electrode for a battery, the method comprising:

coating an active material composition including graphite particles, a binder, and a solvent and a conductive material on a current collector;

applying a magnetic field to the active material composition coated on the current collector to align the graphite particles;

freezing the active material composition while a first magnet is disposed on a bottom surface of the current collector and while a second magnet is disposed above an upper surface of the active material composition such that the magnetic field is applied to the active material composition from the first magnet and the second magnet; and subliming the frozen solvent of the active material composition to remove the frozen solvent and to form an active material layer, wherein the graphite particles include bulk particles having an average diameter of 1 μm to 30 μm and fine particles having an average diameter that is equal to or more than 0.05 μm and less than 1 μm, with a weight ratio of the bulk particles to the fine particles of 10:1 to 3:1, wherein the active material composition includes 2 wt % to 10 wt % of the graphite particle, 0.3 wt % to 1.5 wt % of the binder, 0.3 wt % to 1.5 wt % of the conductive material and 89 wt % to 97 wt % of the solvent, and wherein subliming the frozen solvent of the active material composition is performed in a decompression chamber.

2. The method for forming an electrode for a battery of claim 1, wherein the graphite particles include pyrolytic graphite.

3. The method for forming an electrode for a battery of claim 1, wherein the solvent includes at least one selected from the group consisting of water and an organic solvent including N-methyl pyrrolidone, dimethylformamide, acetone or dimethylacetamide.

4. The method for forming an electrode for a battery of claim 1, wherein a temperature for freezing the active material composition is equal to or less than −100° C.

* * * * *